US012308150B2

(12) United States Patent
Choi et al.

(10) Patent No.: US 12,308,150 B2
(45) Date of Patent: *May 20, 2025

(54) COIL ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Woon Chul Choi, Suwon-si (KR); Jung Hyuk Jung, Suwon-si (KR); Woo Jin Lee, Suwon-si (KR); Han Wool Ryu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 372 days.

This patent is subject to a terminal disclaimer.

(21) Appl. No.: 17/137,961

(22) Filed: Dec. 30, 2020

(65) Prior Publication Data

US 2021/0125766 A1 Apr. 29, 2021

Related U.S. Application Data

(63) Continuation of application No. 15/146,470, filed on May 4, 2016, now Pat. No. 10,902,988.

(30) Foreign Application Priority Data

Jul. 31, 2015 (KR) ........................ 10-2015-0108683

(51) Int. Cl.
*H01F 17/00* (2006.01)
*H01F 17/04* (2006.01)
(Continued)

(52) U.S. Cl.
CPC ......... *H01F 17/0013* (2013.01); *H01F 17/04* (2013.01); *H01F 27/292* (2013.01); *H01F 41/046* (2013.01); *H01F 2017/048* (2013.01)

(58) Field of Classification Search
CPC .... H01F 17/0013; H01F 17/04; H01F 27/292; H01F 2017/048
(Continued)

(56) References Cited

U.S. PATENT DOCUMENTS 5,729,887 A 3/1998 Irie
5,779,813 A 7/1998 Plunkett
(Continued)

FOREIGN PATENT DOCUMENTS

CN 104575935 A 4/2015
CN 104575937 A 4/2015
(Continued)

OTHER PUBLICATIONS

Office Action issued in corresponding Chinese Patent Application No. 201610388335.4, dated Sep. 4, 2017 (English translation).
(Continued)

*Primary Examiner* — Shawki S Ismail
*Assistant Examiner* — Joselito S. Basia
(74) *Attorney, Agent, or Firm* — Morgan, Lewis & Bockius LLP

(57) ABSTRACT

A coil electronic component includes a magnetic body that includes a substrate and a coil part. The coil part includes patterned insulating films disposed on a surface of the substrate and a plating layer formed between the patterned insulating films by plating and having a thickness greater than or equal to its width measured parallel to the surface of the substrate. The plating layer may be formed in a single plating operation, and may have a thickness of 200 μm or more.

15 Claims, 6 Drawing Sheets

(51) Int. Cl.
*H01F 27/29* (2006.01)
*H01F 41/04* (2006.01)

(58) Field of Classification Search
USPC .......................................................... 336/200
See application file for complete search history.

(56) References Cited

U.S. PATENT DOCUMENTS

| | | | | |
|---|---|---|---|---|
| 5,801,100 | A | 9/1998 | Lee | |
| 6,030,877 | A | 2/2000 | Lee et al. | |
| 6,204,997 | B1 * | 3/2001 | Sasaki | G11B 5/3123 360/123.41 |
| 6,466,401 | B1 * | 10/2002 | Hong | G11B 5/313 360/123.25 |
| 6,600,404 | B1 | 7/2003 | Kajino | |
| 6,901,653 | B2 | 6/2005 | Hsiao | |
| 6,940,395 | B2 | 9/2005 | Steinmark | |
| 7,216,419 | B2 | 5/2007 | Kusano | |
| 7,221,250 | B2 | 5/2007 | Yoshida | |
| 7,633,710 | B2 * | 12/2009 | Lee | G11B 5/3163 360/123.17 |
| 7,870,665 | B2 | 1/2011 | Nomura | |
| 9,437,363 | B2 | 9/2016 | Choi et al. | |
| 9,595,384 | B2 * | 3/2017 | Nakamura | H01F 5/00 |
| 9,899,141 | B2 | 2/2018 | Lee | |
| 9,899,143 | B2 * | 2/2018 | Kim | H01F 41/046 |
| 10,515,752 | B2 * | 12/2019 | Choi | H01F 27/323 |
| 10,930,425 | B2 * | 2/2021 | Kim | H01F 27/324 |
| 11,107,616 | B2 * | 8/2021 | Choi | H01F 27/323 |
| 2004/0217440 | A1 | 11/2004 | Ng | |
| 2004/0240106 | A1 * | 12/2004 | Iitsuka | G11B 5/3906 360/123.41 |
| 2006/0001519 | A1 | 1/2006 | Kusano | |
| 2006/0152321 | A1 * | 7/2006 | Jung | H01F 17/0006 336/200 |
| 2008/0002289 | A1 | 1/2008 | Lee | |
| 2008/0100409 | A1 | 5/2008 | Nishikawa | |
| 2009/0243781 | A1 | 10/2009 | Nomura | |
| 2010/0157565 | A1 | 6/2010 | Yoshida | |
| 2013/0222101 | A1 | 8/2013 | Ito | |
| 2013/0249662 | A1 * | 9/2013 | Tonoyama | H01F 17/0013 336/200 |
| 2014/0009254 | A1 | 1/2014 | Ohkubo | |
| 2014/0184374 | A1 * | 7/2014 | Park | H01F 17/0013 336/83 |
| 2014/0247101 | A1 | 9/2014 | Cha et al. | |
| 2014/0292469 | A1 | 10/2014 | Cha et al. | |
| 2015/0028984 | A1 | 1/2015 | Kang | |
| 2015/0035634 | A1 * | 2/2015 | Nakamura | H01F 41/046 336/170 |
| 2015/0035640 | A1 * | 2/2015 | Wang | H01F 41/042 336/200 |
| 2015/0048918 | A1 | 2/2015 | Park | |
| 2015/0091688 | A1 | 4/2015 | Jung | |
| 2015/0102889 | A1 | 4/2015 | Choi et al. | |
| 2015/0109088 | A1 | 4/2015 | Kim et al. | |
| 2015/0123757 | A1 | 5/2015 | Choi | |
| 2015/0255208 | A1 | 9/2015 | Kim | |
| 2015/0270053 | A1 | 9/2015 | Cha | |
| 2015/0270055 | A1 | 9/2015 | Nakamura | |
| 2016/0071643 | A1 | 3/2016 | Heo | |
| 2016/0111193 | A1 | 4/2016 | Jeong | |
| 2016/0163444 | A1 | 6/2016 | Choi | |
| 2016/0343500 | A1 | 11/2016 | Jung | |
| 2018/0054800 | A1 * | 2/2018 | Yeo | H04L 27/2666 |
| 2018/0114619 | A1 * | 4/2018 | Kim | H01F 10/06 |
| 2019/0103215 | A1 | 4/2019 | Jung | |
| 2019/0180928 | A1 | 6/2019 | Lee | |
| 2019/0189336 | A1 | 6/2019 | Kim | |
| 2019/0189338 | A1 | 6/2019 | Kim | |
| 2020/0373061 | A1 * | 11/2020 | Asai | H01F 27/292 |
| 2020/0373064 | A1 * | 11/2020 | Asai | H01F 27/324 |

FOREIGN PATENT DOCUMENTS

| | | | | | |
|---|---|---|---|---|---|
| CN | 104733155 | A | | 6/2015 | |
| CN | 104766715 | A | | 7/2015 | |
| JP | 10-241983 | A | | 9/1998 | |
| JP | 2000-182873 | A | | 6/2000 | |
| JP | 2006-278479 | A | | 10/2006 | |
| JP | 2006-332147 | A | | 12/2006 | |
| JP | 2008-166455 | A | | 7/2008 | |
| JP | 2008166476 | A | * | 7/2008 | |
| JP | 2008277564 | A | * | 11/2008 | H01F 27/2804 |
| JP | 2009111036 | A | * | 5/2009 | |
| JP | 2012178509 | A | * | 9/2012 | |
| JP | 2014-170924 | A | | 9/2014 | |
| JP | 2014-192523 | A | | 10/2014 | |
| JP | 2015-032625 | A | | 2/2015 | |
| JP | 2015-130471 | A | | 7/2015 | |
| JP | 2016103591 | A | * | 6/2016 | H01F 17/00 |
| JP | 2017-17142 | A | | 1/2017 | |
| JP | 6962640 | B2 | * | 11/2021 | H01F 17/0013 |
| KR | 10-1462806 | B1 | | 11/2014 | |
| KR | 10-2015-0071266 | A | | 6/2015 | |
| KR | 10-1532172 | B1 | | 6/2015 | |
| KR | 20150071266 | A | * | 6/2015 | |
| KR | 10-2015-0080737 | A | | 7/2015 | |
| KR | 101565700 | B1 | * | 11/2015 | |
| KR | 20170133140 | A | * | 10/2017 | |
| KR | 101862503 | B1 | * | 5/2018 | |
| KR | 2021133162 | A | * | 11/2021 | |

OTHER PUBLICATIONS

First Office Action issued in Chinese Patent Application No. 201810763278.2 dated Dec. 4, 2019 (English translation).
Korean Office Action issued in Korean Patent Application 10-2017-0067682 dated Jun. 13, 2017 (English translation).
Non-Final Notice of Reasons for Rejection issued on Feb. 7, 2017 in the corresponding Japanese Patent Application No. 2016-095327 (English translation).
Korean Office Action dated Aug. 2, 2016, issued in Korean Patent Application No. 10-2015-0108683 (English translation).
Non-Final Office Action issued in U.S. Appl. No. 15/146,470 dated Jan. 22, 2018.
Non-Final Office Action issued in U.S. Appl. No. 15/146,470 dated Dec. 18, 2018.
Non-Final Office Action issued in U.S. Appl. No. 15/146,470 dated Jan. 13, 2020.
Final Office Action issued in U.S. Appl. No. 15/146,470 dated Aug. 9, 2018.
Final Office Action issued in U.S. Appl. No. 15/146,470 dated Aug. 30, 2019.
Final Office Action issued in U.S. Appl. No. 15/146,470 dated Jul. 9, 2020.
Notice of Allowance issued in U.S. Appl. No. 15/146,470 dated Sep. 15, 2020.
Corrected Notice of Allowance issued in U.S. Appl. No. 15/146,470 dated Sep. 23, 2020.

* cited by examiner

COIL ELECTRONIC COMPONENT AND METHOD OF MANUFACTURING THE SAME

CROSS-REFERENCE TO RELATED APPLICATION

This application is a continuation of U.S. patent application Ser. No. 15/146,470, filed May 4, 2016, now U.S. Pat. No. 10,902,988 issued Jan. 26, 2021, which claims the priority and benefit of Korean Patent Application No. 10-2015-0108683, filed on Jul. 31, 2015 with the Korean Intellectual Property Office, the disclosures of each are incorporated herein by reference.

BACKGROUND

The present disclosure relates to a coil electronic component and a method of manufacturing the same.

An inductor is an electronic component, and in particular is a passive element that is commonly used in electronic circuits together with a resistor and a capacitor to remove noise.

A thin film type inductor maybe manufactured by forming internal coil parts through plating, hardening a magnetic powder-resin composite in which magnetic powder and a resin are mixed with each other to manufacture a magnetic body, and then forming external electrodes on outer surfaces of the magnetic body.

SUMMARY

An aspect of the present disclosure may provide a coil electronic component capable of implementing low direct current (DC) resistance (Rdc) by allowing a thickness difference between coil parts to be uniform. Methods of manufacturing the same are further provided.

According to an aspect of the present disclosure, a coil electronic component includes a magnetic body including a substrate and a coil part. The coil part includes patterned insulating films disposed on a surface of the substrate and a plating layer formed between the patterned insulating films by plating and having a thickness greater than or equal to its width measured parallel to the surface of the substrate.

According to another aspect of the present disclosure, a method of manufacturing a coil electronic component includes patterning a base conductor layer on a substrate. Insulating films are further patterned on the substrate so that the base conductor layer remains exposed. A plating layer is formed between the patterned insulating films by performing plating on the base conductor layer. A magnetic body is formed by laminating magnetic sheets on and below the substrate having the base conductor layer, insulating films, and plating layer thereon.

According to a further aspect of the present disclosure, a method for manufacturing a coil part of an electronic component includes forming an insulating film on a surface of the substrate. The insulating film delineates a coil pattern on the surface of the substrate, and the insulating film is formed to a thickness measured from the surface of the substrate that is equal to or larger than a spacing between adjacent windings of the insulating film in the coil pattern. Following the forming of the insulating film, a plating layer is formed on the surface of the substrate within the coil pattern delineated by the insulating film. The insulating film may be formed to have an aspect ratio Tp/Wi of 10 or more, where Tp is the thickness of the insulating film measured from the surface of the substrate and Wi is a width of the insulating film measured parallel to the surface of the substrate.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
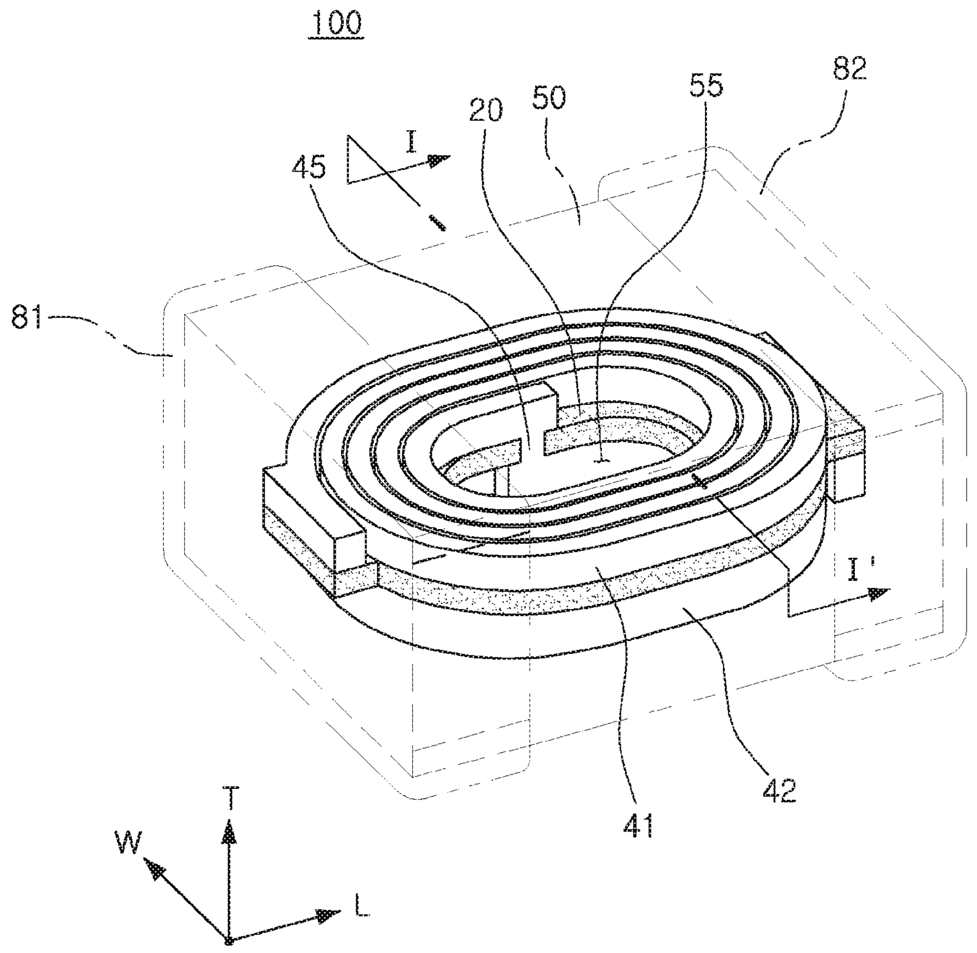
FIG. 1 is a schematic perspective view showing an inner coil part of a coil electronic component according to an exemplary embodiment.

Hereinafter, embodiments of the present inventive concepts will be described with reference to the attached drawings.

The present inventive concepts may, however, be exemplified in many different forms and should not be construed as being limited to the specific embodiments set forth herein. Rather, these embodiments are provided so that this disclosure will be thorough and complete, and will fully convey the scope of the inventive concepts to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another member, component, region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's positional relationship relative to other element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device maybe otherwise oriented (rotated 90 degrees or at other orientations) and the spatially relative descriptors used herein may be interpreted accordingly.

The terminology used herein is for describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups, but do not preclude the presence or addition of one or more other features, integers, steps, operations, members, elements, and/or groups.

Hereinafter, embodiments of the present inventive concepts will be described with reference to schematic views illustrating embodiments of the present inventive concepts. In the drawings, components having ideal shapes are shown. However, variations from these shapes, for example due to variability in manufacturing techniques and/or tolerances, also fall within the scope of the disclosure. Thus, embodiments of the present inventive concepts should not be construed as being limited to the particular shapes of regions shown herein, but should more generally be understood to include changes in shapes resulting from manufacturing methods and processes. The following embodiments may also be constituted by one or a combination thereof.

The present inventive concepts described below may be implemented in a variety of configurations, and the description below describes only some illustrative configurations. However, one of skill in the art will understand that the inventive concepts are not limited to the particular configurations shown herein, but extend to other configurations as well.

Coil Electronic Component

FIG. 1 is a schematic perspective view showing an inner coil part of a coil electronic component 100 according to an exemplary embodiment. Portions of the coil electronic component 100 of FIG. 1 are shown as being translucent for illustrative purposes so that the internal coil part(s) of the coil electronic component 100 are visible.

Referring to FIG. 1, as an example of a coil electronic component 100, a thin film type inductor used in a power line of a power supply circuit is disclosed.

A coil electronic component 100 according to an exemplary embodiment may include a magnetic body 50, coil parts 41 and 42 embedded in the magnetic body 50, and first and second external electrodes 81 and 82 disposed on outer surfaces of the magnetic body 50 and electrically connected to the coil parts 41 and 42.

In the coil electronic component 100 according to an exemplary embodiment, a 'length direction' refers to an 'L' direction of FIG. 1, a 'width direction' refers to a 'W' direction of FIG. 1, and a 'thickness direction' refers to a 'T' direction of FIG. 1.

The magnetic body 50 may form the outer appearance body of the coil electronic component 100, and may be formed of any material without limitation as long as the material exhibits magnetic properties. For example, the magnetic body 50 may be formed of a material including a ferrite or a magnetic metal powder.

The ferrite may be, for example, a Mn—Zn based ferrite, a Ni—Zn based ferrite, a Ni—Zn—Cu based ferrite, a Mn—Mg based ferrite, a Ba-based ferrite, a Li-based ferrite, or the like.

The magnetic metal powder may include any one or more selected elements from the group consisting of iron (Fe), silicon (Si), chromium (Cr), aluminum (Al), and nickel (Ni). For example, the magnetic metal powder may include an Fe—Si—B—Cr based amorphous metal powder, but is not limited thereto.

The magnetic metal powder may have a particle diameter of 0.1 μm to 30 μm, and may be present in a form dispersed in an epoxy resin or a thermosetting resin such as polyimide, or the like.

A first coil part 41 having a coil shape may be formed on one surface (e.g., one main surface) of a substrate 20 disposed in the magnetic body 50, and a second coil part 42 having the coil shape may be formed on the other surface (e.g., the other main surface) of the substrate 20 opposite to the one surface of the substrate 20.

The first and second coil parts 41 and 42 may be formed by performing electroplating.

The substrate 20 may be formed of, for example, a polypropylene glycol (PPG) substrate, a ferrite substrate, a metal based soft magnetic substrate, or the like.

A central portion of the substrate 20 may be penetrated to form a hole (e.g., a hole extending through the substrate from the one main surface to the other main surface), and the hole may be filled with a magnetic material to form a core part 55. The hole may be aligned with central portions of each of the coil parts 41 and 42, and the core part 55 may extend through the hole and holes formed in central portions of each of the coil parts 41 and 42. As the core part 55 filled with the magnetic material is formed, inductance Ls may be improved.

The first and second coil parts 41 and 42 may each be formed in a spiral shape on a respective surface of the substrate 20, and the first and second coil parts 41 and 42 formed on one surface and the other surface of the substrate 20 maybe electrically connected to each other through a via 45 formed to penetrate through the substrate 20.

The first and second coil parts 41 and 42, and the via 45 may be formed to include a metal having excellent electrical conductivity, and may be formed of, for example, silver (Ag), palladium (Pd), aluminum (Al), nickel (Ni), titanium (Ti), gold (Au), copper (Cu), platinum (Pt), alloys thereof, or the like.

A direct current (DC) resistance (Rdc), which is one of the main properties of the inductor, may be decreased as a cross-sectional area of internal coil part(s) is increased. In addition, inductance of the inductor may be increased as an area of the magnetic material through which magnetic flux passes (e.g., an open area in the central portion of the coil parts) is increased.

Therefore, in order to decrease the DC resistance (Rdc) and improve the inductance, an increase of the cross-sectional area of the internal coil part(s) and an increase in the area of the magnetic material are required.

Examples of a method for increasing the cross-sectional area of the internal coil part(s) may include a method for increasing a width of the coil and a method for increasing a thickness of the coil.

However, in the case in which the width of the coil is increased, a risk of generating short circuits between neighboring coils or coil windings may be highly increased, and/or a limit to the number of turns or windings of an implementable coil within a given volume maybe reached. Further, the increase in the number of turns or windings can cause a reduction in an area of the magnetic material and thereby deteriorate efficiency. The coil may thus face a limitation in implementing a high capacity product.

Instead, to provide improved performance, the internal coil part(s) may be provided with a structure exhibiting a high aspect ratio (AR) by increasing a thickness of the coil to the width of the coil.

An aspect ratio (AR) of the internal coil part(s) may mean a value obtained by dividing the thickness of the coil conductor by the width of the coil conductor. The thickness of the coil conductor may be measured in the thickness direction 'T' orthogonal to the main surface of the substrate 20 on which the coil part 41 is disposed, while the width of the coil conductor may be measured in the width direction 'W' orthogonal to the thickness direction 'T' in FIG. 2. Note that the aspect ratio (AR) of the internal coil part(s) may be evaluated based on a cross-section of a conductor that is wound to form the coil parts 41 and 42, and the thickness and width measurements may correspond to the thickness and width of the coil conductor (e.g., at numeral 61) as shown in the cross-section of FIG. 2. As the thickness of the coil conductor is increased to be greater than the width of the coil conductor, the high aspect ratio (AR) may be implemented.

However, in a case in which the coil part(s) are formed by performing a pattern plating method, in which a plating resist is patterned and plated by an exposure and development process according to the related art, in order to form the thickness of the coil to be thick, a thickness of the plating resist needs to be formed to be thick. However, the exposure process faces a limitation in which a lower portion of the plating resist is not smoothly exposed as the thickness of the plating resist is formed to be thick. Thus, it may be difficult to increase the thickness of the coil through the use of the exposure and development manufacturing process.

In addition, in order to maintain a form of the thick plating resist, the plating resist may be required to have a width of a predetermined minimum value or greater. Since a width of the plating resist becomes an interval between neighboring coils after removal of the plating resist during the manufacturing process, the interval between the neighboring coil windings may be increased as the width of the plating resist is increased. As a result, there is a limitation in improving DC resistance (Rdc) and inductance (Ls) characteristics, since a larger interval between neighboring coil windings is formed as the thickness (and corresponding width) of the plating resist is increased.

Meanwhile, other processes have been developed to solve an exposure limitation, for example by forming a first plating conductor pattern after a first resist pattern is formed by exposing and developing a resist film, and forming a second plating conductor pattern after forming a second resist pattern by again exposing and developing the first plating conductor pattern onto the first resist pattern.

However, in a case in which the internal coil part(s) are formed by performing only the multi-exposure pattern plating method as described in the previous paragraph, there is a limitation in increasing the cross-section area of the internal coil part. Furthermore, since the interval between the neighboring coils is increased, it is difficult to improve DC resistance (Rdc) and inductance (Ls) characteristics.

In addition, in order to form the coil part(s) of the structure having the high aspect ratio (AR), a method for implementing the coil part(s) by adding anisotropic plating onto a plating layer by isotropic plating is generally attempted.

The above-mentioned anisotropic plating scheme may implement the remaining height of the coil required after forming a seed pattern by the anisotropic plating. However, in coils formed according to the above-mentioned scheme, a shape of the coil is generally tapered in a fan shape, the coil has decreased uniformity, and a distribution of the DC resistance (Rdc) may be affected.

In addition, according to the above-mentioned scheme, the shape of the coil may be bent, and it can therefore be difficult to form an insulating layer on the coil pattern. As a result, a non-insulating space may occur between the coil patterns, thereby causing defects and potential short circuits.

Thus, according to an exemplary embodiment, a need exists for a coil having a structure of the coil part that is capable of obtaining the high aspect ratio (AR) using only the isotropic plating having a small thickness distribution.

Figure 2:
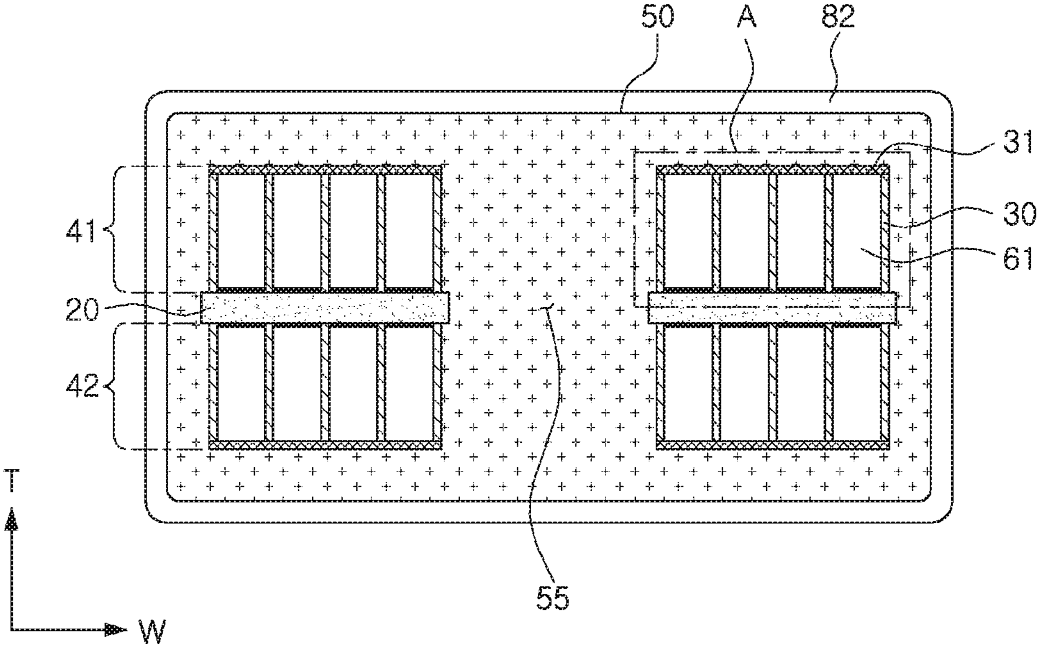
FIG. 2 is a cross-sectional view taken along line I-I' of FIG. 1.

FIG. 2 is a cross-sectional view taken along line I-I' of FIG. 1.

Referring to FIG. 2, the coil electronic component according to an exemplary embodiment may include the magnetic body 50, wherein the magnetic body 50 may include the substrate 20, and the coil parts 41 and 42 including patterned insulating films 30 disposed on the substrate 20 and a plating layer 61 formed between the patterned insulating films 30 by plating. The plating layer 61 may form the coil conductor of the coil parts 41 and 42, and may be formed in spiral pattern to form the spiral-patterned coil parts 41 and 42. As shown in the cross-sectional view of FIG. 2, adjacent windings of the plating layer 61 (i.e., adjacent windings of the coil conductor) are separated from each other by the insulating films 30.

The plating layer 61 may be formed by isotropic plating having a small thickness distribution, and may be formed by plating once (e.g., in a single plating operation or step). In particular, the plating layer 61 may be formed in the single plating operation or step to its full thickness shown in FIG. 2.

Since the plating layer 61 is formed by plating once, at least one internal interface appearing when the plating layer 61 is formed by plating twice or more, that is, at least one internal interface partitioning the plating layer into two layers or more does not appear.

The presence of an internal interface, such as would appear in a plating layer formed in a multi-plating process, may cause deterioration of DC resistance (Rdc) characteristics and electrical characteristics in the coil electronic component.

Thus, according to an exemplary embodiment, since the plating layer 61 is formed by a single plating operation or step, DC resistance (Rdc) characteristics and electrical characteristics may be improved.

However, the configuration of the plating layer 61 is not limited thereto, and the plating layer 61 may also be configured of a plurality of plating layers.

The plating layer 61 may be formed by isotropic plating having a small thickness distribution. The isotropic plating may correspond to a plating method in which a width and a thickness of the plating layer are grown together, and is a technology contrasted with an anisotropic plating method in which growth speeds of the plating in a width direction of the plating layer and a thickness direction thereof are different.

In addition, since the plating layer 61 is formed between the patterned insulating films 30 by the isotropic plating method, a shape thereof may be a rectangular shape. However, the shape of the plating layer 61 may be slightly modified by process variation.

Since the plating layer 61 has the rectangular shape, a cross-section area of the coil part may be increased, and an area of the magnetic material may be increased, thereby reducing DC resistance (Rdc) and improving inductance.

Further, since a ratio of a thickness to a width of the coil part is increased, a structure having a high aspect ratio (AR) may be implemented, thereby increasing the cross-section area of the coil parts and improving DC resistance (Rdc).

According to an exemplary embodiment, the magnetic body may include the patterned insulating films 30 disposed on the substrate 20.

In the case of a general coil electronic component, after the coil part is formed on the substrate 20, an insulating film is formed to cover the coil part.

However, according to an exemplary embodiment, in order to implement low DC resistance (Rdc) by allowing a thickness difference of the coil part to be uniform and reduce defects in which the insulating layer is not formed in a space between the coil patterns by straightly forming the coil part without being bent, the insulating films 30 may be patterned on the substrate 20 before forming the plating layer 61.

Specifically, by patterning the insulating films 30 to have a narrow width and a large thickness so that the plating layer 61 has the high aspect ratio (AR), the isotropic plating process may be performed between the patterned insulating films 30, thereby implementing the plating layer 61 having the high aspect ratio (AR).

The insulating films 30, which are photosensitive insulating films, may be formed of, for example, an epoxy based material, but are not limited thereto.

In addition, the insulating films 30 may be formed by an exposure and development process of photo resist (PR).

The plating layer 61 forming the coil parts 41 and 42 may not be directly in contact with a magnetic material forming the magnetic body 50 due to the patterned insulating films 30.

A detailed process of forming the patterned insulating films 30 and the plating layer 61 disposed between the patterned insulating films 30 according to an exemplary embodiment will be described below.

According to an exemplary embodiment, the magnetic body may further include a cover insulating layer 31 disposed on the insulating films 30 and the plating layer 61.

The cover insulating layer 31 may be formed of a material different from that of the insulating films 30.

In addition, since the cover insulating layer 31 is formed on the insulating films 30 and the plating layer 61 after disposing the patterned insulating films 30 and the plating layer 61 between the patterned insulating films 30, the cover insulating layer 31, which is formed of a material different from that of the insulating films 30 and has a shape different from that of the insulating films 30, may be distinguished from the insulating films 30 and the plating layer 61 by a boundary with the insulating films 30 and the plating layer 61.

One end portion of the first coil part 41 formed on one surface of the substrate 20 may be exposed to one end surface of the magnetic body 50 in the length direction of the magnetic body 50. Additionally, one end portion of the second coil part 42 formed on the other surface of the substrate 20 maybe exposed to the other end surface of the magnetic body 50 (e.g., the other end surface that is opposite to the one end surface of the magnetic body 50) in the length direction of the magnetic body 50.

However, end portions of each of the first and second coil parts 41 and 42 are not limited thereto. More generally, one end portion of each of the first and second coil parts 41 and 42 may be exposed to at least one surface of the magnetic body 50.

The first and second external electrodes 81 and 82 may each be formed on a respective outer surface of the magnetic body 50 so as to each be connected to one of the first and second coil parts 41 and 42 exposed to the end surfaces of the magnetic body 50.

Figure 3:
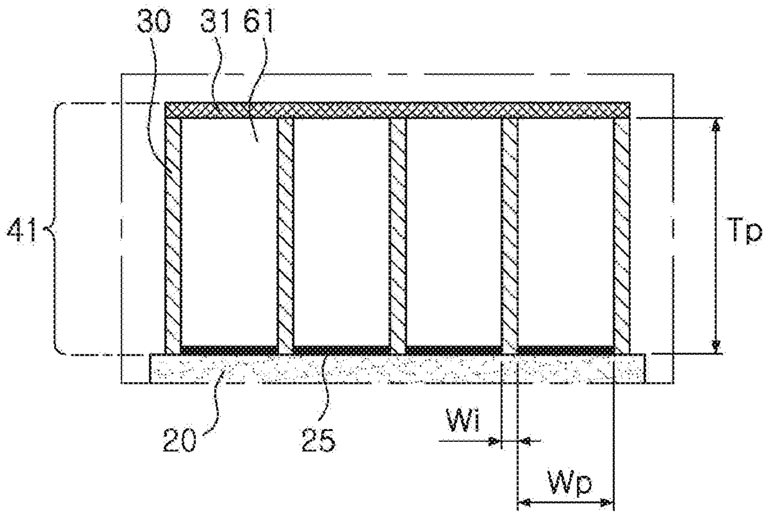
FIG. 3 is an enlarged schematic view of an example of part 'A' of FIG. 2.

FIG. 3 is an enlarged schematic view of an example of part 'A' of FIG. 2.

Referring to FIG. 3, the coil part 41 according to an exemplary embodiment may include base conductor layers 25 disposed on the substrate 20, the plating layer 61 disposed on the substrate 20 and formed on the base conductor layers 25 between the patterned insulating films 30 by plating, and the cover insulating layer 31 disposed on the insulating films 30 and the plating layer 61.

The base conductor layers 25 may be formed by performing an electroless plating or sputtering method, forming a resist pattern, and then performing an etching process and a resist delamination process on the substrate 20.

A width Wp of the base conductor layer 25 may be 10 μm to 30 μm, but is not limited thereto.

A width Wi of the insulating film 30 may be 1 to 20 μm, and a thickness thereof is not particularly limited, and may be determined according to a required thickness of the plating layer 61 formed by the isotropic plating.

A method of forming the insulating films 30 is not particularly limited, but may be performed by a general technique of forming a circuit.

A thickness Tp of the plating layer 61 may be 200 μm or more, and an aspect ratio Tp/Wp thereof may be 1.0 or more.

The plating layer 61 is formed to have the thickness Tp of 200 μm or more and the aspect ratio Tp/Wp of 1.0 or more, and thus the internal coil parts 41 and 42 having the high aspect ratio (AR) may be implemented.

The plating layer 61 is formed between the patterned insulating films 30 by the isotropic plating method, and thus an exposure limitation caused by the thickness of the plating resist may be overcome, and the plating layer 61 having a total thickness Tp of 200 μm or more may be implemented.

In addition, the aspect ratio Tp/Wp of the plating layer 61 may be 1.0 or more, but according to an exemplary embodiment, since a width of the plating layer 61 is similar to that of the base conductor layer 25, a high aspect ratio of 3.0 or more may be implemented.

As such, according to an exemplary embodiment, since the plating layer 61 is formed on the base conductor layers 25 between the patterned insulating films 30 by the isotropic plating, the coil parts may be straightly formed without being bent, whereby defects in which an insulating layer is not formed in a space between the coil patterns may be reduced.

In addition, since a thickness difference between an outer coil pattern and an inner coil pattern may be allowed to be uniform, a cross-section area of the inner coil part may be increased, and DC resistance (Rdc) characteristics may be improved.

Figure 4:
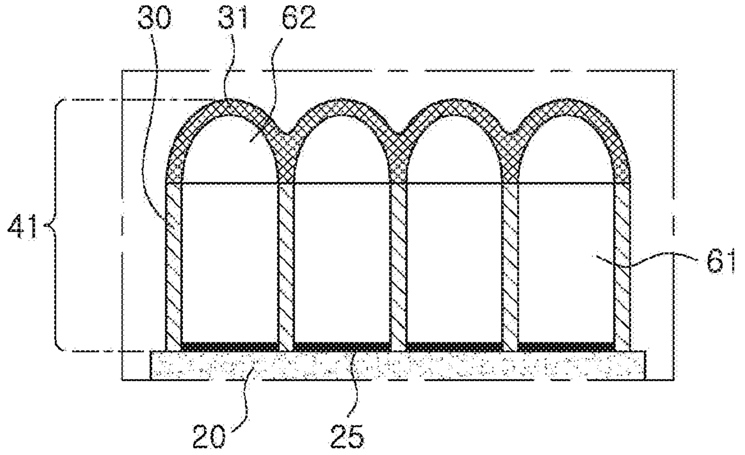
FIG. 4 is an enlarged schematic view of another example of part 'A' of FIG. 2.

FIG. 4 is an enlarged schematic view of another example of part 'A' of FIG. 2.

Referring to FIG. 4, a coil part 41 according to another exemplary embodiment may include the base conductor layers 25 disposed on the substrate 20, the plating layer 61 disposed on the substrate 20 and formed on the base conductor layers 25 between the patterned insulating films 30 by plating on the basis of the patterned insulating films 30 and the base conductor layers 25, an anisotropic plating layer 62 disposed on the plating layer 61, and the cover insulating layer 31 disposed on the insulating films 30 and the anisotropic plating layer 62.

The plating layer 61 may be an isotropic plating layer of which a growth degree in a width direction and a growth degree in a thickness direction are similar, and the anisotropic plating layer 62 may be a plating layer having a shape in which a growth degree in the width direction is suppressed and the growth degree in the thickness direction is comparatively significantly larger.

The anisotropic plating layer 62 may be formed on a top surface of the plating layer 61.

As such, the anisotropic plating layer 62 is further formed on the plating layer 61, which is the isotropic plating layer, and thus the internal coil parts 41 and 42 having a higher aspect ratio (AR) may be implemented, and DC resistance (Rdc) characteristics may be further improved.

The anisotropic plating layer 62 may be formed by adjusting current density, concentration of a plating solution, plating speed, or the like.

As an upper portion of the anisotropic plating layer 62 has a round shape or a curved shape, the cover insulating layer 31 disposed on the insulating films 30 and the anisotropic plating layer 62 may be formed along a round or curved surface shape of the anisotropic plating layer 62.

The cover insulating layer 31 may be formed by a chemical vapor deposition (CVD) method, a dipping method using a polymer coating solution having low viscosity, or the like, but is not limited thereto.

Method of Manufacturing Coil Electronic Component

FIGS. 5A through 5F are views illustrating sequential steps of a method of manufacturing a coil electronic component according to an exemplary embodiment.

Figure 5A:
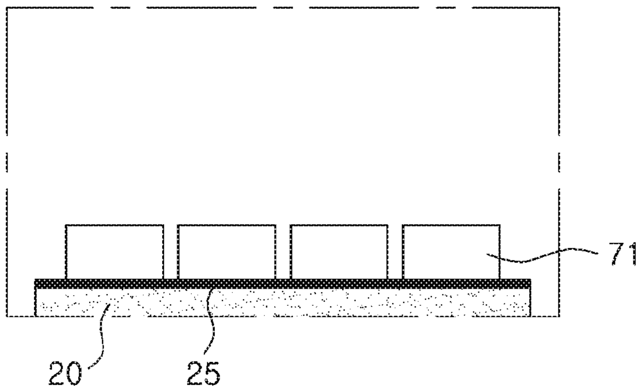
FIGS. 5A through 5F are views illustrating sequential steps of a method of manufacturing a coil electronic component according to an exemplary embodiment.
Figure 5B:
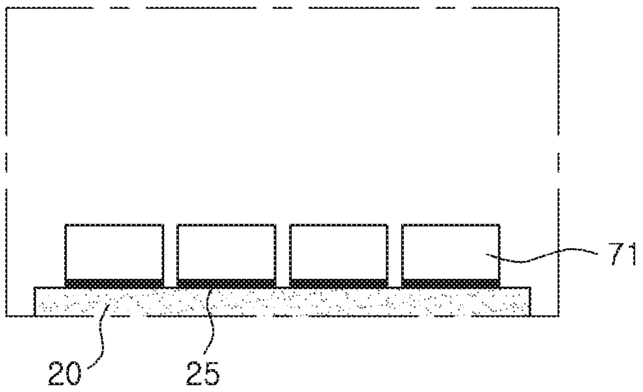
Figure 5C:
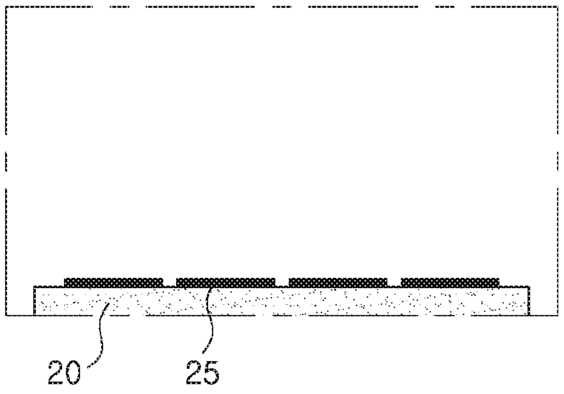

Referring to FIGS. 5A through 5C, a substrate 20 may be prepared, and a base conductor layer 25 may be patterned on the substrate 20.

A via hole (not illustrated) may be formed in the substrate 20, and the via hole may be formed by using a mechanical drill or a laser drill, but is not limited thereto.

The laser drill may be, for example, a $CO_2$ laser or YAG laser.

Specifically, referring to FIG. 5A, after the base conductor layer 25 is formed by performing an electroless plating or sputtering method on the substrate 20, a resist pattern 71 may be formed. The resist pattern 71 may be formed in a spiral pattern on the base conductor layer 25.

Referring to FIG. 5B, in order to pattern the base conductor layer 25, an etching process may be performed. The etching process may remove the base conductor layer 25 from the surface of the substrate 20 in regions that are not covered by the resist pattern 71.

Next, as illustrated in FIG. 5C, a patterned base conductor layer 25 may be formed on the substrate 20 by a process of delaminating the resist pattern 71. Following the delaminating of the resist pattern 71, the patterned base conductor layer 25 may form a spiral pattern on the substrate 20.

A width of each trace of the base conductor layer 25 may be 10 μm to 30 μm, but is not limited thereto.

Figure 5D:
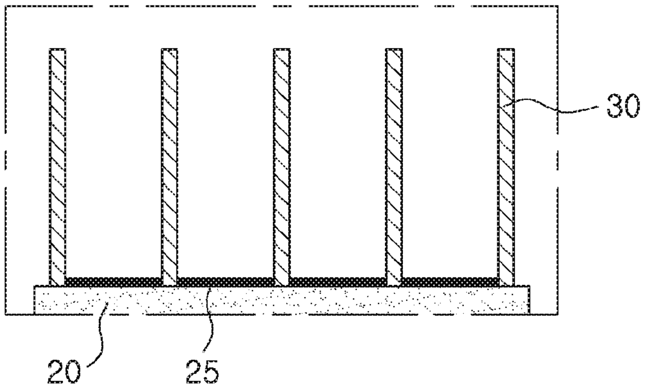

Next, referring to FIG. 5D, patterned insulating films 30 may be formed on the substrate 20.

The insulating films 30 may be formed on areas of the substrate 20 that are exposed between adjacent portions of the patterned base conductor layers 25, so as to be patterned. As noted above, the patterned base conductor layer 25 may form a spiral pattern on the substrate 20. As such, the areas of the substrate 20 that are exposed between adjacent portions of the patterned base conductor layers 25 may also form a spiral pattern that is interwoven with the spiral pattern of the patterned base conductor layer 25. The insulating film 30 may also be formed in the spiral pattern, for example so as to delineate a coil pattern on the surface of the substrate.

A width of the insulating film 30 may be 1 μm to 20 μm, and a thickness thereof is not particularly limited, and may be determined according to a required thickness of a plating layer 61 formed by an isotropic plating. In one example, the width of the insulating film 30 is approximately equal to the width of areas of the substrate 20 that are expected between adjacent portions of the patterned base conductor layers 25. For instance, the insulating film may be formed to a thickness (measured from the surface of the substrate) that is equal to or larger than a spacing between adjacent windings of the insulating film in the coil pattern. In the same or another example, the insulating film can be formed to have an aspect ratio Tp/Wi of 10 or more, wherein Tp is the thickness of the insulating film measured from the surface of the substrate and Wi is a width of the insulating film measured parallel to the surface of the substrate. The thickness Tp of the insulating film may be 200 μm or more and the width Wi of the insulating film may be of 1 μm to 20 μm.

A method of forming the insulating films 30 is not particularly limited, but may be performed by a general technique of forming a circuit.

In addition, the insulating films 30, which are photosensitive insulating films, may be, for example, formed of an epoxy based material, but are not limited thereto.

In addition, the insulating films 30 may be formed by an exposure and development process of photo resist (PR).

In turn, the plating layer 61 that forms or configures coil parts 41 and 42 formed in a subsequent process may not be directly in contact with a magnetic material forming the magnetic body 50 due to the patterned insulating films 30.

Since the insulating films 30 serves as a dam for the isotropic plating for forming the plating layer 61 having a thickness of 200 μm or more, an actual thickness thereof may be formed to be 200 μm or more (as measured orthogonally to a main surface of the substrate 20 on which the insulating films 30 are formed).

Figure 5E:
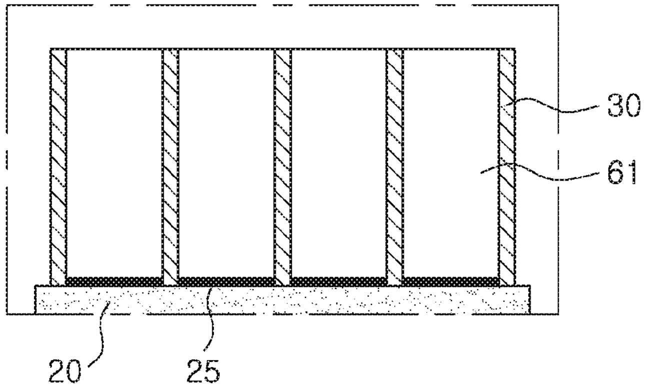

Referring to FIG. 5E, the plating layer 61 may be formed between the patterned insulating films 30 by the isotropic plating method.

A thickness of the plating layer 61 may be 200 μm or more, and an aspect ratio Tp/Wp thereof may be 1.0 or more.

The plating layer 61 may be formed to have the thickness Tp of 200 μm or more and the aspect ratio Tp/Wp of 1.0 or more, and thus the internal coil parts 41 and 42 having the high aspect ratio (AR) may be implemented.

The plating layer 61 may be formed between the patterned insulating films 30 by the isotropic plating method, and thus an exposure limitation caused by the thickness of the plating resist may be overcome, and the plating layer having a total of thickness Tp of 200 μm, or more may be implemented.

Figure 5F:
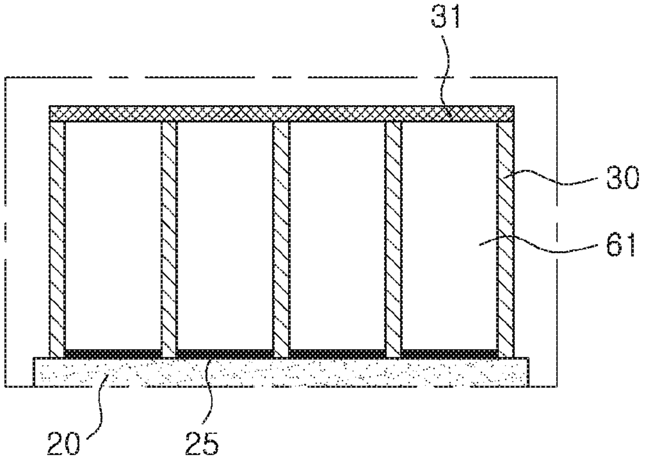

Referring to FIG. 5F, a cover insulating layer 31 may be formed on the insulating films 30 and the plating layer 61.

The cover insulating layer 31 may be formed of a material different from that of the insulating films 30.

In addition, since the cover insulating layer 31 is formed on the insulating films 30 and the plating layer 61 after disposing the patterned insulating films 30 and the plating layer 61 between the patterned insulating films 30, the cover insulating layer 31, which is formed of a material different from that of the insulating films 30 and has a shape different from that of the insulating films 30, may be distinguished from the insulating films 30 and the plating layer 61 by a boundary with the insulating films 30 and the plating layer 61.

The cover insulating layer 31 may be formed by a screen printing method, a method such as a spray coating process, a chemical vapor deposition (CVD) method, a dipping method using a polymer coating solution having low viscosity, or the like, but is not limited thereto.

In FIGS. 5A through 5F, the base conductor layer 25 is illustrated, but the width thereof may not be equal to those illustrated in FIGS. 5A through 5F, and an actual width thereof may be smaller.

FIGS. 5A through 5F have detailed steps of a method of forming the plating layer 61 on one surface of the substrate 20. More generally, the method can include forming plating layers on each of two opposing surface of the substrate 20 in order to form structures such as those shown in FIGS. 1 and 2. In this regard, each of the steps described above as being performed on one surface of the substrate 20 can be performed on the two opposing surfaces of the substrate 20. Additionally, the method may include a step of forming a conductive via (e.g., 45 in FIG. 1) penetrating through the substrate 20 and electrically interconnecting the plating layers (e.g., plating layers forming the coil parts 41 and 42 of FIG. 1) formed on each of the two opposing surfaces of the substrate 20.

Figure 6:
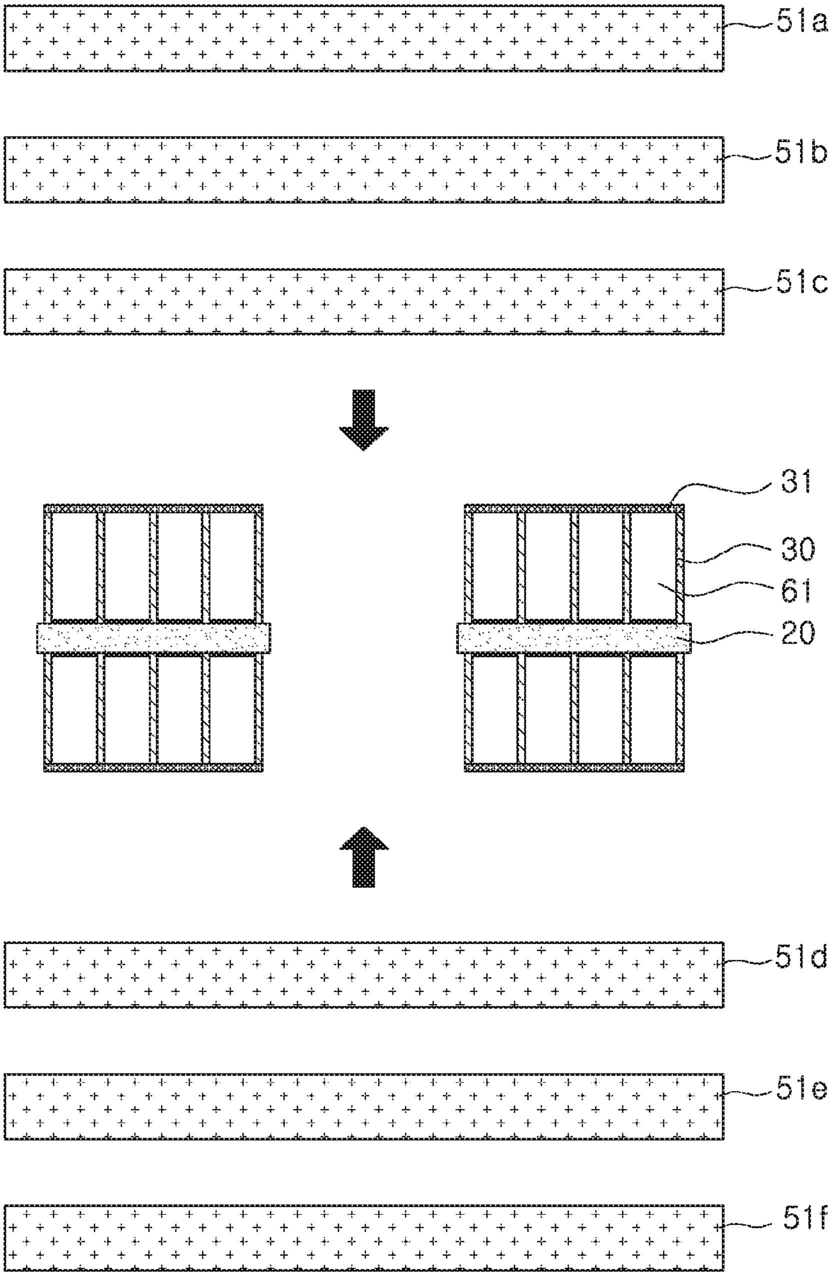
FIG. 6 is a view illustrating a process of forming a magnetic body according to an exemplary embodiment.

FIG. 6 is a view illustrating a process of forming a magnetic body according to an exemplary embodiment in the present disclosure.

Referring to FIG. 6, magnetic sheets 51*a*, 51*b*, 51*c*, 51*d*, 51*e*, and 51*f* may be laminated on and below an insulating substrate 20 on which the first and second internal coil parts 41 and 42 are formed.

The magnetic sheets 51*a*, 51*b*, 51*c*, 51*d*, 51*e*, and 51*f* may be manufactured in a sheet type. The magnetic sheets may be formed by manufacturing a slurry mixing a magnetic material, for example magnetic metal powder, with organic materials such as a thermosetting resin, and the like, applying the slurry on a carrier film by a doctor blade method, and then drying the applied slurry.

After a plurality of magnetic sheets 51*a*, 51*b*, 51*c*, 51*d*, 51*e*, and 51*f* are laminated, the magnetic body 50 may be formed by compressing and curing the laminated magnetic sheets 51*a*, 51*b*, 51*c*, 51*d*, 51*e*, and 51*f* onto the structure including the insulating substrate 20 and the first and second internal coil parts 41 and 42 by a laminate method or a hydrostatic pressing method.

Except for the above-mentioned description, a description of characteristics overlapping those of the coil electronic component according to an exemplary embodiment described above will be omitted.

Board for Mounting Coil Electronic Component

Figure 7:
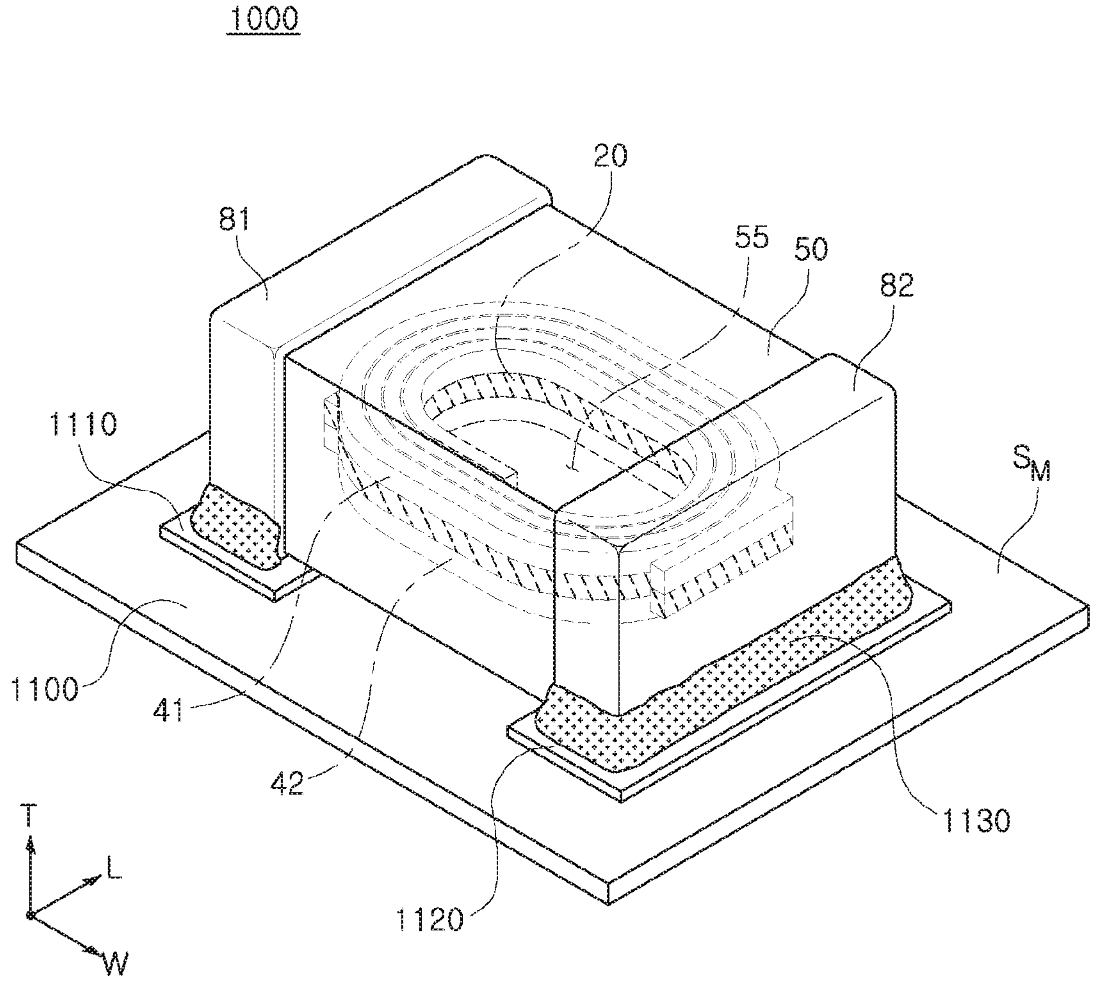
FIG. 7 is a perspective view illustrating the coil electronic component of FIG. 1 mounted on a printed circuit board.

FIG. 7 is a perspective view illustrating the coil electronic component of FIG. 1 mounted on a printed circuit board.

A board 1000 for mounting a coil electronic component according to an exemplary embodiment may include a printed circuit board 1100 on which a coil electronic component 100 is mounted, and first and second electrode pads 1110 and 1120 formed on an upper surface of the printed circuit board 1100 to be spaced apart from each other.

Here, the first and second external electrodes 81 and 82 formed on both end surfaces of the coil electronic component 100 maybe electrically connected to the printed circuit board 1100 by a solder 1130. Specifically, the first and second external electrodes 81 and 82 are disposed on the first and second electrode pads 1110 and 1120, respectively, to be in contact therewith.

The first and second internal coil parts 41 and 42 of the mounted coil electronic component 100 may be disposed to be parallel with respect to amounting surface $S_M$ of the printed circuit board 1100. The mounting surface $S_M$ of the printed circuit board 1100 may be the surface having the first and second electrode pads 1110 and 1120 thereon.

Except for the above-mentioned description, a description of characteristics overlapping those of the coil electronic component according to an exemplary embodiment described above will be omitted.

As set forth above, according to the exemplary embodiments, the coil parts may be straightly formed without being bent, whereby defects in which the insulating layer is not formed in a space between the coil patterns may be reduced.

According to an exemplary embodiment, by allowing the thickness difference between the outer coil pattern and the inner coil pattern to be uniform, the cross-section area of the inner coil part may be increased, and DC resistance (Rdc) characteristics may be improved.

Further, in a case in which an anisotropic plating layer is added on the coil parts, since a structure having a greater aspect ratio (AR) may be implemented, DC resistance (Rdc) characteristics may be further improved.

While exemplary embodiments have been shown and described above, it will be apparent to those skilled in the art that modifications and variations could be made without departing from the scope of the present invention as defined by the appended claims.

What is claimed is:

1. A coil electronic component comprising:
a magnetic body,
wherein the magnetic body includes:
a substrate,
a coil part including a patterned insulating film disposed on a surface of the substrate, a base conductor layer disposed on the substrate between portions of the patterned insulating film and contacting the patterned insulating film, and a plating layer disposed on the base conductor layer between the portions of the patterned insulating film and having a thickness greater than or equal to its width measured parallel to the surface of the substrate, and
a cover insulating layer disposed on the patterned insulating film and the plating layer in a stacking direction, and formed of a material different from that of the patterned insulating film,
wherein the patterned insulating film has an aspect ratio which is greater than an aspect ratio of the plating layer, and
wherein an outermost portion of the patterned insulating film is spaced apart from external surfaces of the magnetic body opposing each other in a direction perpendicular to the stacking direction.

2. The coil electronic component of claim 1, wherein the plating layer is formed of a single plating layer.

3. The coil electronic component of claim 1, wherein the plating layer has a thickness Tp of 200 μm or more measured orthogonally to the surface of the substrate having the coil part thereon, and a cross section of the plating layer has an aspect ratio Tp/Wp of 1.0 or more relative to the width Wp of the cross section.

4. The coil electronic component of claim 1, wherein the patterned insulating film has a width of 1 μm to 20 μm between adjacent windings of the plating layer of the coil part.

5. The coil electronic component of claim 1, wherein the plating layer has a rectangular cross-section, an anisotropic plating layer is further disposed on the plating layer, and the cover insulating layer is disposed on the patterned insulating film and the anisotropic plating layer.

6. The coil electronic component of claim 1, wherein the patterned insulating film and the plating layer extend to a same thickness measured from the surface of the substrate.

7. The coil electronic component of claim 1, wherein the patterned insulating film has a thickness measured from the surface of the substrate that is equal to or larger than a spacing between adjacent windings of the coil part.

8. The coil electronic component of claim 7, wherein the patterned insulating film has an aspect ratio Tp/Wi of 10 or more, wherein Tp is the thickness of the patterned insulating film measured from the surface of the substrate and Wi is a width of the patterned insulating film measured parallel to the surface of the substrate.

9. The coil electronic component of claim 8, wherein the thickness Tp of the patterned insulating film is 200 μm or more and the width Wi of the patterned insulating film is 1 μm to 20 μm.

10. The coil electronic component of claim 7, wherein the plating layer has a thickness Tp of 200 μm or more in a single plating layer.

11. The coil electronic component of claim 7, further comprising:

a conductive via penetrating through the substrate and electrically interconnecting plating layers formed on each of two opposing surfaces of the substrate.

12. The coil electronic component of claim 1, wherein the patterned insulating film is disposed directly on the surface of the substrate, and the base conductor layer is disposed directly on the surface of the substrate between the portions of the patterned insulating film and contacts the patterned insulating film.

13. The coil electronic component of claim 12, wherein the plating layer is spaced apart from the surface of the substrate.

14. The coil electronic component of claim 1, wherein the base conductor layer directly contacts each of two opposing surfaces of the substrate.

15. The coil electronic component of claim 1, wherein the cover insulating layer is arranged entirely outside of a space defined between the portions of the patterned insulating film.

* * * * *